(12) United States Patent
Parikh

(10) Patent No.: US 12,610,280 B2
(45) Date of Patent: Apr. 21, 2026

(54) PROVISION FOR NEAR-RT RIC TO UPDATE POLICY CAPABILITIES ON A1 INTERFACE

(71) Applicant: Parallel Wireless, Inc., Nashua, NH (US)

(72) Inventor: Ketan Parikh, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 467 days.

(21) Appl. No.: 17/857,245

(22) Filed: Jul. 5, 2022

(65) Prior Publication Data

US 2023/0007538 A1    Jan. 5, 2023

Related U.S. Application Data

(60) Provisional application No. 63/217,803, filed on Jul. 2, 2021.

(51) Int. Cl.
| | |
|---|---|
| *H04W 28/16* | (2009.01) |
| *H04L 41/0893* | (2022.01) |
| *H04L 41/0894* | (2022.01) |
| *H04W 8/02* | (2009.01) |

(52) U.S. Cl.
CPC ......... *H04W 28/16* (2013.01); *H04L 41/0893* (2013.01); *H04L 41/0894* (2022.05); *H04W 8/02* (2013.01)

(58) Field of Classification Search
CPC .... H04W 28/16; H04W 8/02; H04L 41/0893; H04L 41/0894
See application file for complete search history.

(56) References Cited

U.S. PATENT DOCUMENTS

| | | | | |
|---|---|---|---|---|
| 2021/0235277 | A1* | 7/2021 | Parekh | H04W 16/14 |
| 2022/0295309 | A1* | 9/2022 | Akhtar | H04W 24/02 |
| 2023/0110387 | A1* | 4/2023 | Urie | H04W 8/186 |
| | | | | 455/418 |
| 2023/0336422 | A1* | 10/2023 | Parikh | H04W 4/24 |
| 2023/0337170 | A1* | 10/2023 | Stjernholm | H04W 24/02 |
| 2024/0073770 | A1* | 2/2024 | Shah | H04W 36/00833 |

OTHER PUBLICATIONS

O-RAN.WG2.Use-Case-Requirements-v03.00, 12 pages, Jun. 2021 (Year: 2021).*
O-RAN.WG3.RICARCH-v02.00, 5 pages, Jun. 2021 (Year: 2021).*
"O-RAN Working Group 2 A1 interface: Transport Protocol", ORAN-WG2.A1.TP-v01.00, 2019.

(Continued)

*Primary Examiner* — Sharmin Chowdhury
(74) *Attorney, Agent, or Firm* — Michael Y. Saji; Ashish Patel

(57) ABSTRACT

A method, computer readable media, and system are described for providing updating policy capabilities between Near-Real Time (RT) Radio Access Network (RAN) Intelligent Controller (RIC) and Non-Real Time RIC. In one embodiment a method includes sending a policy update notification message from a near-RT RIC to a non-RT MC with a list of policy types that are supported whenever the node identifies that there is a change in currently exchanged policy types; and updating policy to reflect the update notification.

18 Claims, 9 Drawing Sheets

(56)     References Cited

OTHER PUBLICATIONS

"O-RAN Working Group 2 A1 interface: Application Protocol", O-RAN.WG2.A1AP-v03.00, 2021.

"O-RAN Working Group 3 Near-Real-time RAN Intelligent Controller Architecture & E2 General Aspects and Principles", O-RAN. WG3.E2GAP-v01.01, 2020.

"O-RAN Working Group 3 Near-Real-time RAN Intelligent Controller Near-RT RIC Architecture", O-RAN.WG3.RICARCH-v01. 01, 2021.

"O-RAN Working Group 2 A1 interface: General Aspects and Principles", O-RAN.WG2.A1GAP-v02.01, 2021.

* cited by examiner

PROVISION FOR NEAR-RT RIC TO UPDATE POLICY CAPABILITIES ON A1 INTERFACE

CROSS-REFERENCE TO RELATED APPLICATIONS

This application claims priority under 35 U.S.C. § 119(e) to U.S. Provisional Pat. App. No. 63/217,803 filed Jul. 2, 2021, titled "Provision For Near-RT RIC To Update Policy Capabilities On A1 Interface" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017. This document also hereby incorporates by reference U.S. Pat. Nos. 9,107, 092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Existing mechanism to share policy and policy types between Non-RT-RIC & NEAR RT-RIC on A1 Interface-as per ORAN Specifications, policy types represent the capabilities of the near-RT RIC and as per call-flow defined in specifications, the list of policy types (owned by near-RT RIC) indicating the capabilities of near-RT RIC could be fetched by non-RT RIC by sending an http query. Once the list of policy types identified by policy type Id's are fetched by near-RT RIC, the relevant schemas are identified and used for creation of policies identified by policy Id (owned by non-RT RIC) and the same is enforced at near-RT RIC. The non-RT RIC can update the existing policies identified by policy Id. The near-RT MC can send feedback policy message to notify about an enforcement status change of a policy between 'enforced' and 'not enforced'.

SUMMARY

A method is disclosed to identify a mechanism for updating policy capabilities between Near-Real Time (RT) Radio Access Network (RAN) Intelligent controller (MC) and Non-Real Time MC over an A1 interface. In one example a method for providing updating policy capabilities between Near-Real Time MC and Non-Real time MC includes sending a policy update notification message from near RT RIC to non-RT MC with a list of policy types that are supported whenever the node identifies that there is change in currently exchanged policy types; wherein the message indicates new policy types that are to be supported for which non-RT MC can create new policy; and wherein the message indicates the policy types that are no longer supported and the instance of same needs to be deleted.

In another example embodiment a computer readable media includes instructions for identifying a mechanism for updating policy capabilities between Near-Real Time (RT) Radio Access Network (RAN) Intelligent controller (MC) and Non-Real Time MC over an A1 interface. The instructions include instructions for sending a policy update notification message from near RT RIC to non-RT MC with a list of policy types that are supported whenever the node identifies that there is change in currently exchanged policy types; wherein the message indicates new policy types that are to be supported for which non-RT MC can create new policy; and wherein the message indicates the policy types that are no longer supported and the instance of same needs to be deleted.

In another example embodiment a system providing updating policy capabilities between Near-Real Time (RT) Radio Access Network (RAN) Intelligent Controller (MC) and Non-Real Time MC includes a near-RT MC; a non-RT MC in communication with the near-RT MC; wherein the near-RT MC sends a policy update notification message to the non-RT MC with a list of policy types that are supported whenever the node identifies that there is a change in currently exchanged policy types; and wherein the policy is updated to reflect the update notification.

DETAILED DESCRIPTION

There is no provision for near-RT RIC to update policy types if the same gets modified between earlier exchange of messages between non-RT MC and near-RT MC. For instance, if some additional policy types are to be enforced or an existing policy type is to be deleted.

The scenarios where policy types could be updated at near-RT RIC are: subscription deletion by Centralized Unit (CU)/Distributed Unit (DU) node (via E2 interface); subscription from CU/DU node (via E2 interface) is updated to support additional/reduced functionalities (could be indicated by Event Trigger Definitions); addition/deletion of UE's, if the non-RT RIC needs to express policies for a dynamically defined group of UEs (i.e., a set of UEs), it is done through a set of policies for individual UEs; and UE mobility could change the policy capabilities as well.

Current specifications indicate methods for providing information of supported policy types only when non-RT MC fetches the same before creating a policy. Additionally, the near-RT MC could send the feedback policy for an existing enforced policy with the status of policy.
Problems with Feedback Policy Mechanism:

In case the near-RT RIC indicates that the all the applied policies is 'not enforced' anymore, non-RT MC is required to send additional message to delete the policy instance at near-RT RIC; and, to get the set of new policy types supported, an additional message has to be sent by non-RT RIC before creating new set of policies to be enforced.

In case the near-RT RIC indicates that only few policies from list of 'enforced' policies are applied, the non-enforced policies would still be required to be deleted at near-RT RIC; and the non-RT MC might still not know that there are any additional policy types to be updated and so it might not send request to get new of policy types.

The specification does not provide any other ways to update the policy type at non-RT MC from near-RT MC.

Figure 1:
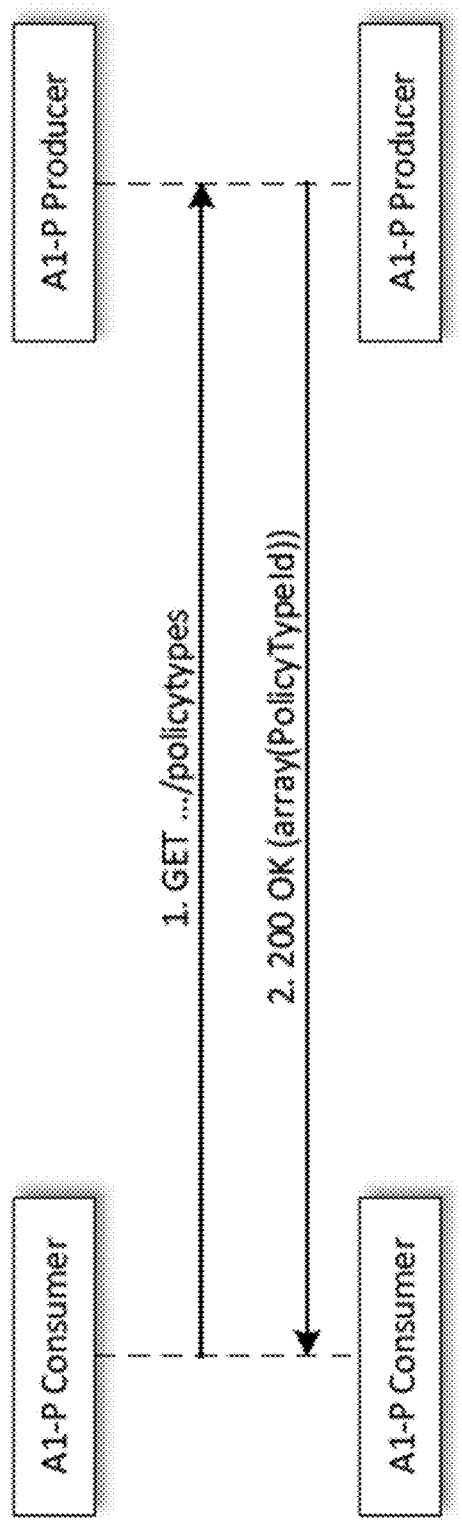
FIG. 1 is a call flow for querying policy types from near-RT MC, in accordance with some embodiments.

A call flow 100 for querying policy types from near-RT MC is shown in FIG. 1.

Figure 2:
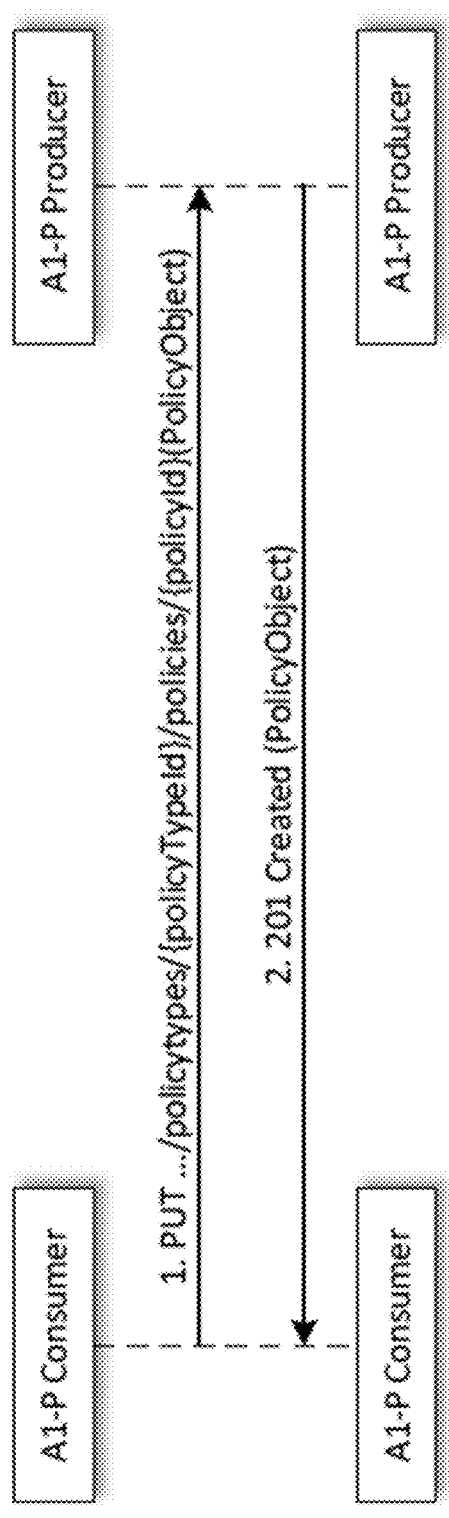
FIG. 2 is a call flow for creating a policy at near-RT MC, in accordance with some embodiments.

A call flow 200 for creating a policy at near-RT RIC is shown in FIG. 2.

Figure 3:
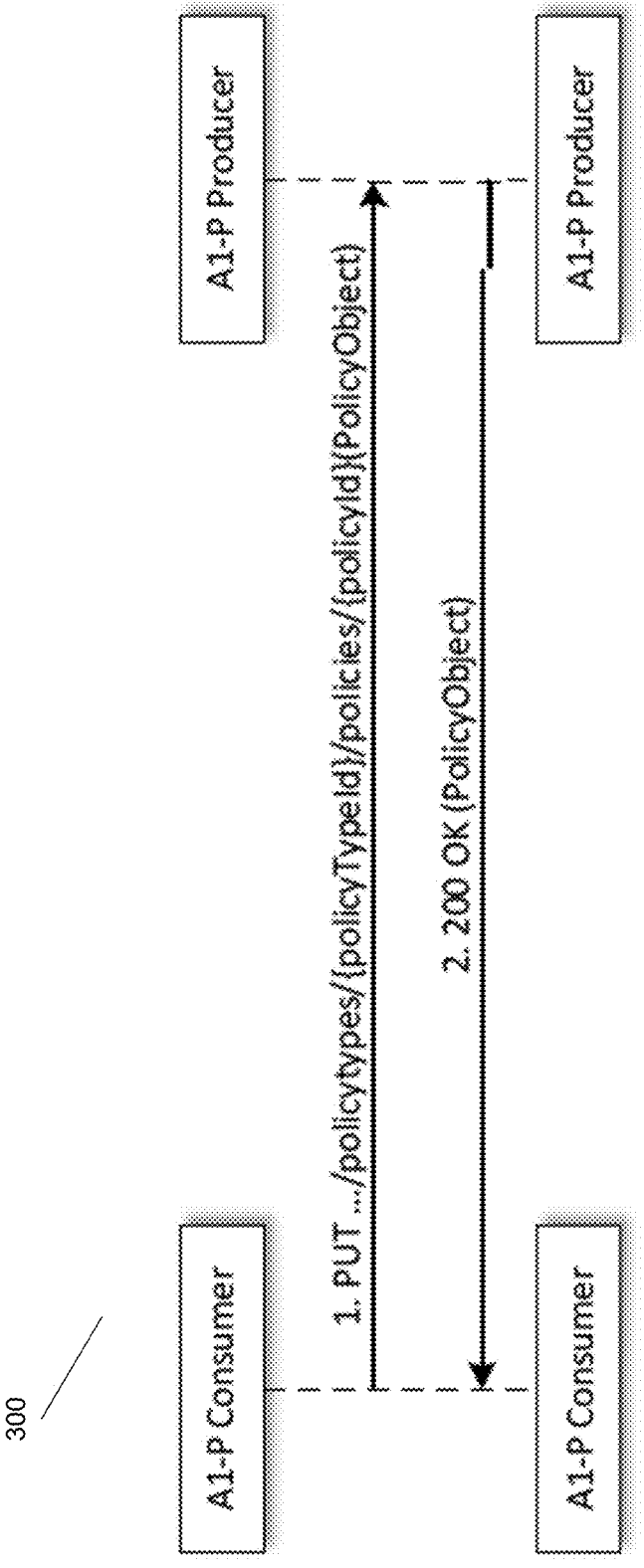
FIG. 3 is a call flow for updating policy at near-RT MC, in accordance with some embodiments.

A call flow 300 for updating policy at near-RT MC is shown in FIG. 3.

Figure 4:
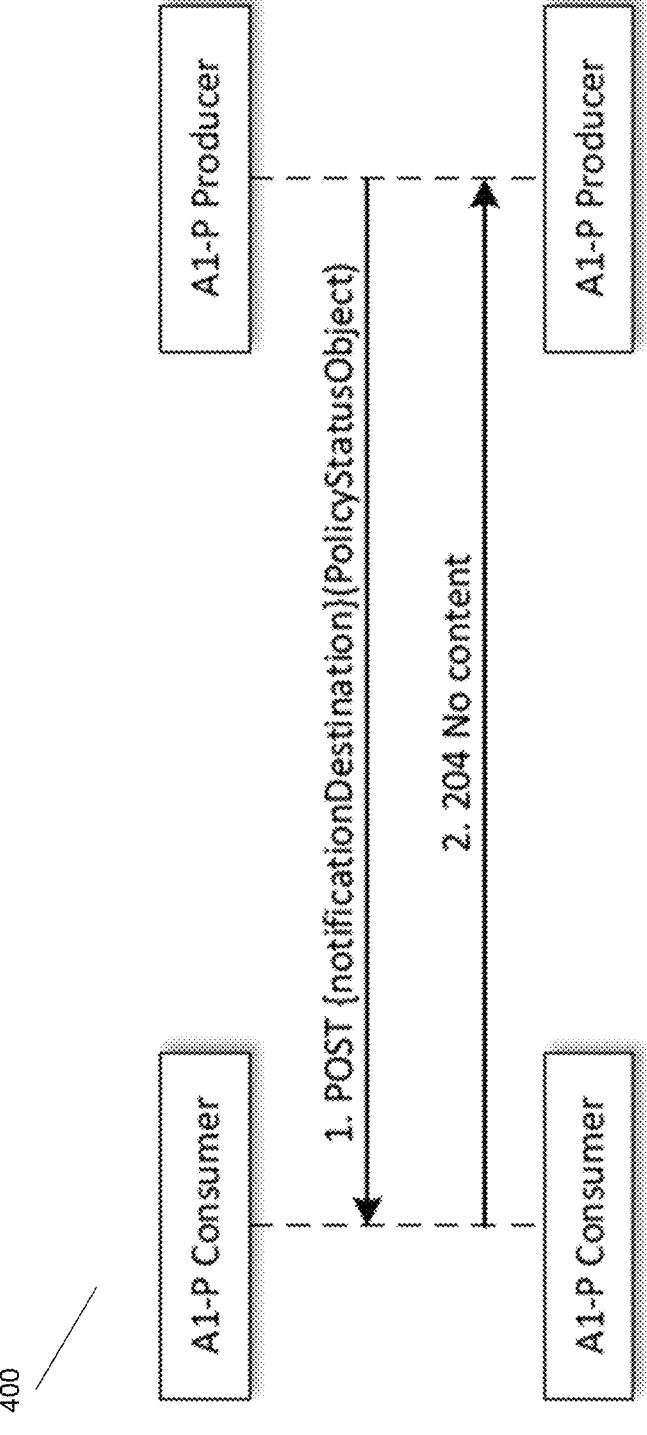
FIG. 4 is a call flow 400 for feedback policy sent by near-RT MC, in accordance with some embodiments.

A call flow 400 for feedback policy sent by near-RT MC is shown in FIG. 4.

In the call flows of FIGS. 1-4, A1-P Consumer is non-RT MC and A1-P Producer is near-RT MC.

A solution to above problems is to have a policy update notification sent from near-RT RIC to non-RT MC with list of policy types that are supported whenever the node identifies that there is change in currently exchanged policy types.

With this mechanism a single message would indicate the new policy types that are to be supported for which non-RT MC can create new policy, and the same message can also indicate the policy types that are no longer supported and the instance of same needs to be deleted.

If during earlier exchange of messages non-RT MC queries near-RT MC and near RT MC sends list of policy types supported by same as POLICY_TYPE_A, POLICY-_TYPE_B and POLICY_TYPE_C, the policies for same will be created by non-RT MC and enforced at near-RT MC. However, at some later point of time due to certain event, some policy types at near-RT RIC do not hold valid anymore (for e.g., POLICY_TYPE_B) and some new policy types is to be applied, say POLICY_TYPE_D, With existing mechanism near-RT RIC can only send Feedback Policy with "POLICY_TYPE_B" as "not enforced" and non-RT RIC would take action to delete the instance of that policy only. With proposed solution near-RT MC can send a message to non-RT MC with list of supported policy types as POLICY_TYPE_A, POLICY_TYPE_C and POLICY_TYPE_D. This would help non-RT RIC to understand that POLICY_TYPE_B is no longer supported and needs to be deleted and at the same time a new policy for POLICY_TYPE_D shall be created.

Figure 5:
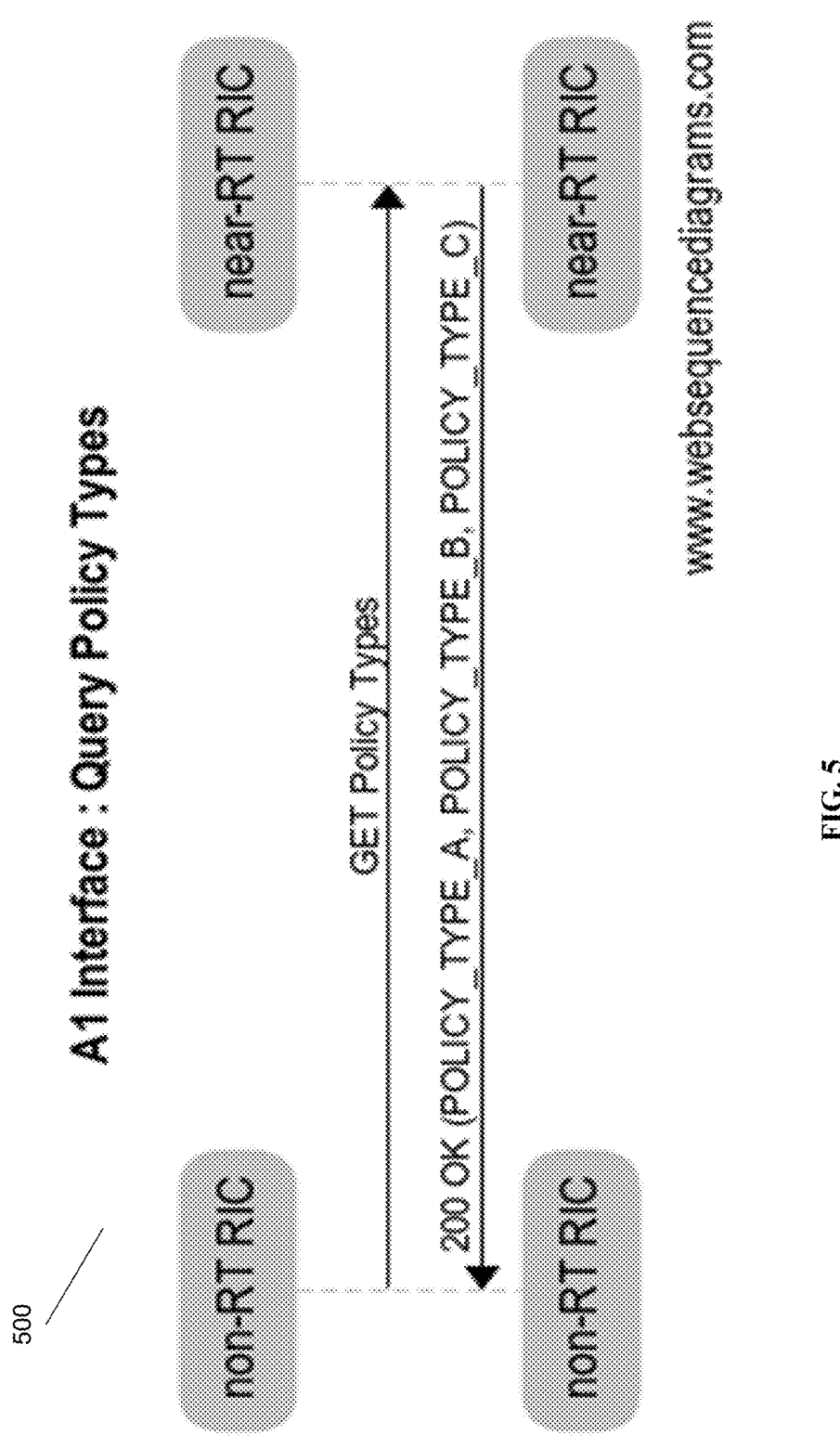
FIG. 5 is a call flow for querying policy types, in accordance with some embodiments.
Figure 6:
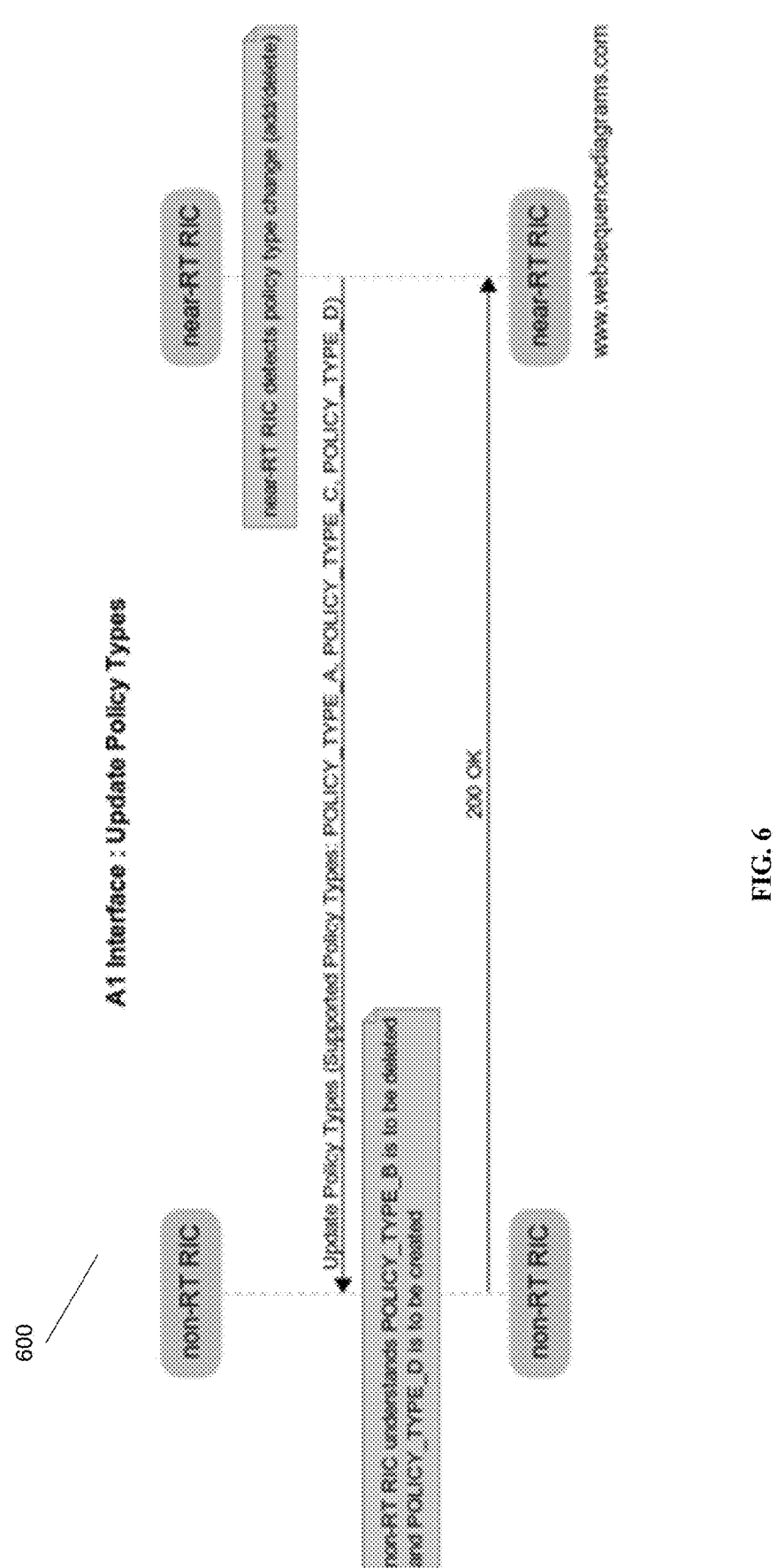
FIG. 6 is a call flow for updating policy types, in accordance with some embodiments.

An architecture diagram 500 is shown in FIG. 5. A call flow for updating policy types 600 is shown in FIG. 6.

ORAN is a new technology and few vendors have deployed near-RT RIC. This solution would help non-RT MC in understanding the capabilities of near-RT and the actions can be taken appropriately.

Figure 7:
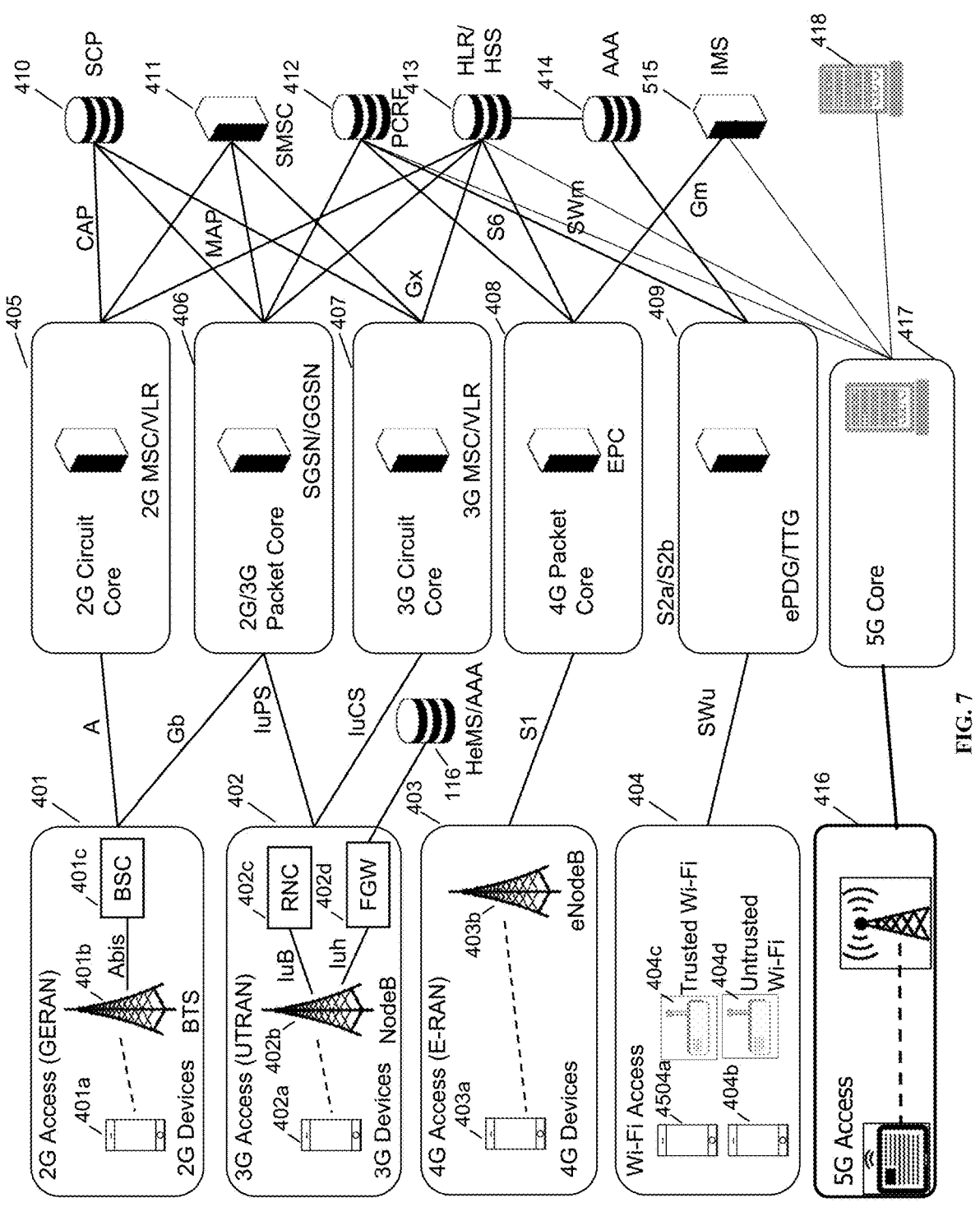
FIG. 7 is a schematic network architecture diagram for 3G and other-G prior art networks.

Shown in FIG. 7 is a schematic network architecture diagram for 3G and other-G prior art networks. The diagram shows a plurality of "Gs," including 2G, 3G, 4G, 5G and Wi-Fi. 2G is represented by GERAN 701, which includes a 2G device 701*a*, BTS 701*b*, and BSC 701*c*. 3G is represented by UTRAN 702, which includes a 3G UE 702*a*, nodeB 702*b*, RNC 702*c*, and femto gateway (FGW, which in 3GPP namespace is also known as a Home nodeB Gateway or HNBGW) 702*d*. 4G is represented by EUTRAN or E-RAN 703, which includes an LTE UE 703*a* and LTE eNodeB 703*b*. Wi-Fi is represented by Wi-Fi access network 704, which includes a trusted Wi-Fi access point 704*c* and an untrusted Wi-Fi access point 704*d*. The Wi-Fi devices 704*a* and 704*b* may access either AP 704*c* or 704*d*. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701*c* is required for Abis compatibility with BTS 701*b*, while for the 3G UTRAN, an RNC 702*c* is required for Iub compatibility and an FGW 702*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. The present invention is also applicable for 5G networks since the same or equivalent functions are available in 5G. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
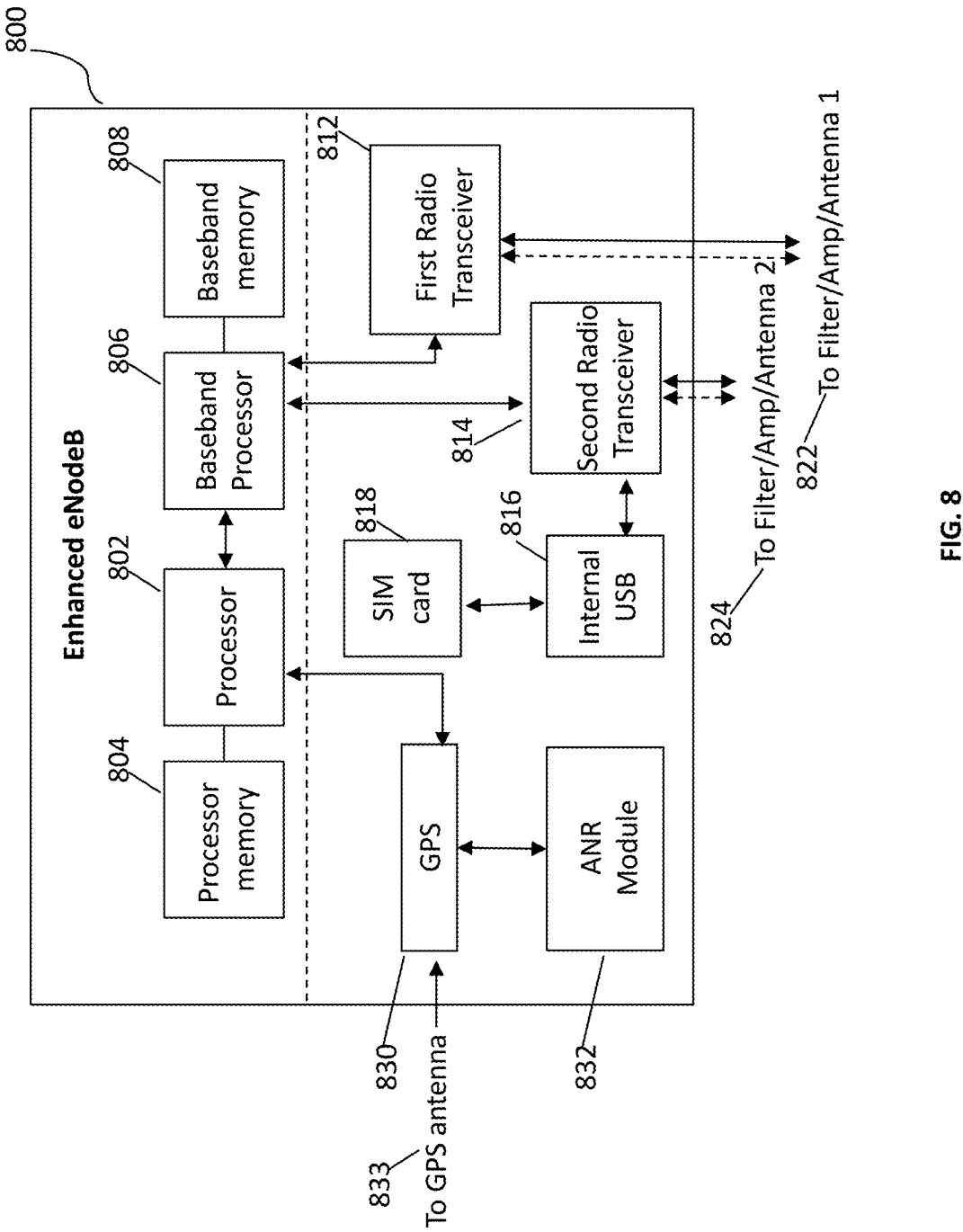
FIG. 8 is an enhanced eNodeB for performing the methods described herein, in accordance with some embodiments.
Figure 9:
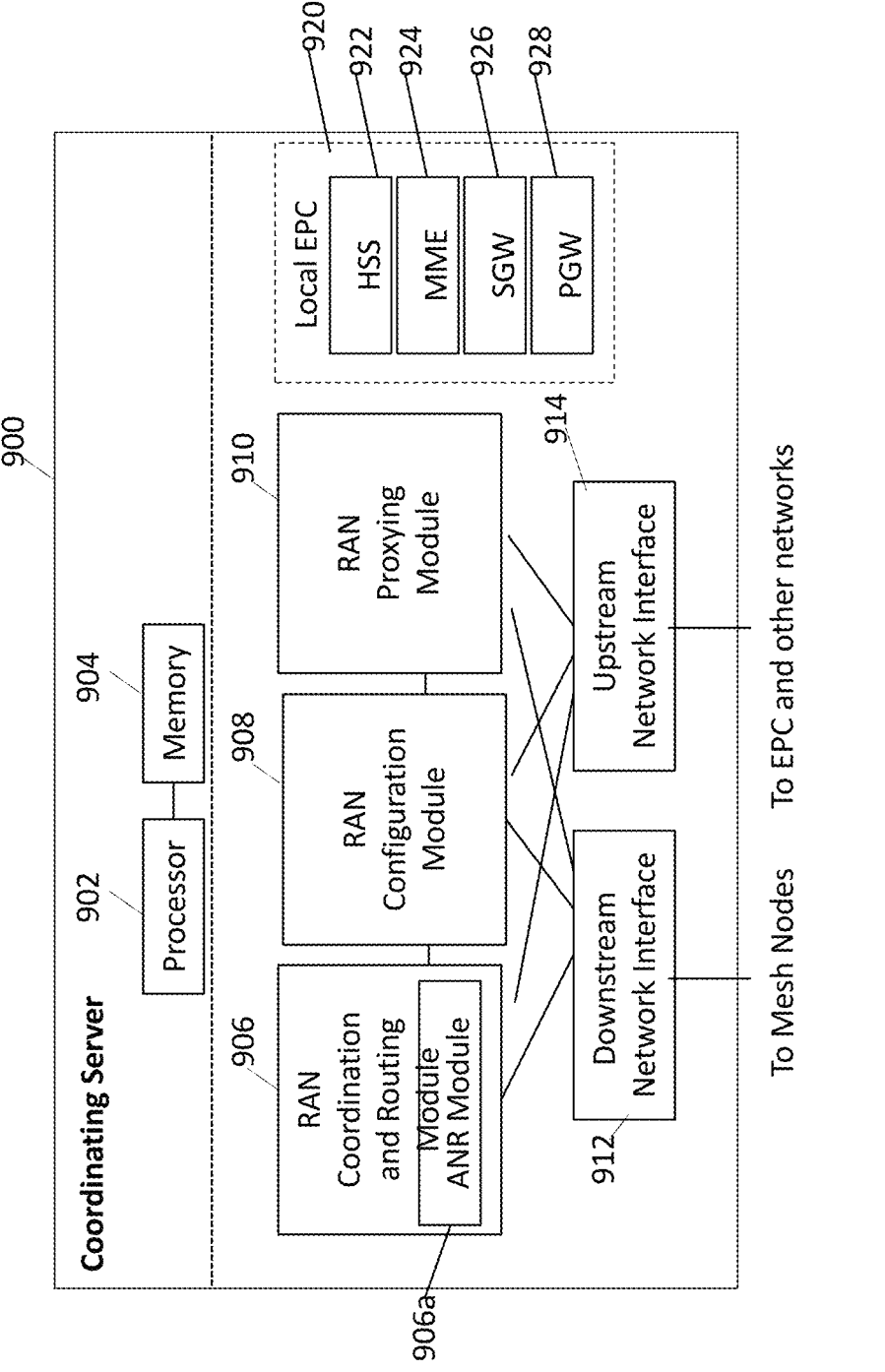
FIG. 9 is a coordinating server for providing services and performing methods as described herein, in accordance with some embodiments.

Shown in FIG. 8 is an enhanced eNodeB for performing the methods described herein, in accordance with some embodiments. eNodeB 800 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Shown above is a coordinating server for providing services and performing methods as described herein, in accordance with some embodiments. Coordinating server 900 includes processor 902 and memory 904, which are configured to provide the functions described herein. Also present are radio access network coordination/routing (RAN Coordination and routing) module 906, including ANR module 906*a*, RAN configuration module 908, and RAN proxying module 910. The ANR module 906*a* may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders, as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface.

The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of updating policy capabilities between Near-Real Time (RT) Radio Access Network (RAN) Intelligent Controller (RIC) and Non-Real Time RIC, the method comprising:

sending a policy type update notification message from the near-RT RIC to the non-RT RIC with a list of policy types that are supported whenever the near-RT RIC identifies that there is a change in currently exchanged policy types, wherein the policy type update notification message indicates a new policy type that is to be supported for which the non-RT RIC can create new policy; and updating support of one or more policy types to reflect the update notification.

2. The method of claim 1, wherein the policy type update notification message further indicates policy types that are no longer supported and the instance of no longer supported policy types needs to be deleted.

3. The method of claim 1, wherein the change occurs due to subscription deletion by a centralized unit (CU)/distributed unit (DU) node.

4. The method of claim 1, wherein the change occurs due to subscription from a centralized unit (CU)/distributed unit (DU) node.

5. The method of claim 1, wherein the change occurs to support additional or reduced functionalities.

6. The method of claim 1, wherein the change occurs due to addition or deletion of User Equipments (UEs).

7. The method of claim 1, wherein the change occurs when the non-RT RIC needs to express policies for a dynamically defined group of User Equipments (UEs).

8. The method of claim 1, wherein the change occurs due to User Equipment (UE) mobility.

9. A non-transitory computer-readable medium containing instructions for updating policy capabilities between Near-Real Time (RT) Radio Access Network (RAN) Intelligent Controller (RIC) and Non-Real Time RIC which, when executed, cause a processor to perform steps comprising:

sending a policy type update notification message from near-RT RIC to non-RT RIC with a list of policy types that are supported whenever the near-RT RIC identifies that there is a change in currently exchanged policy types, wherein the policy type update notification message indicates a new policy type that is to be supported for which non-RT RIC can create new policy; and updating support of one or more policy types to reflect the update notification.

10. The non-transitory computer-readable medium of claim 9, wherein the policy type update notification message further indicates policy types that are no longer supported and the instance of the no longer supported policy types needs to be deleted.

11. The non-transitory computer-readable medium of claim 9, wherein the change occurs due to subscription deletion by a centralized unit (CU)/distributed unit (DU) node.

12. The non-transitory computer-readable medium of claim 9, wherein the change occurs due to subscription from a centralized unit (CU)/distributed unit (DU) node.

13. The non-transitory computer-readable medium of claim 9, wherein the change occurs to support additional or reduced functionalities.

14. The non-transitory computer-readable medium of claim 9, wherein the change occurs due to addition or deletion of User Equipments (UEs).

15. The non-transitory computer-readable medium of claim 9, wherein the change occurs when the non-RT RIC needs to express policies for a dynamically defined group of User Equipments (UEs).

16. The non-transitory computer-readable medium of claim 9, wherein the change occurs due to User Equipment (UE) mobility.

17. A system for updating policy capabilities between Near-Real Time (RT) Radio Access Network (RAN) Intelligent Controller (RIC) and Non-Real Time RIC comprising:

a near-RT RIC;

a non-RT RIC in communication with the near-RT RIC;

wherein the near-RT RIC sends a policy type update notification message to the non-RT RIC with a list of policy types that are supported whenever the near-RT RIC identifies that there is a change in currently exchanged policy types, wherein the policy type update notification message indicates a new policy type that is to be supported for which non-RT RIC can create new policy; and wherein support of one or more policy types is updated to reflect the update notification.

18. The system of claim 17, wherein the policy type update notification message further indicates policy types that are no longer supported and the instance of the no longer supported policy types needs to be deleted.

5

* * * * *